United States Patent
Kasedou et al.

(10) Patent No.: US 10,080,000 B2
(45) Date of Patent: Sep. 18, 2018

(54) INTERCOM SYSTEM

(71) Applicant: Panasonic Intellectual Property Management Co., Ltd., Osaka (JP)

(72) Inventors: Hirofumi Kasedou, Saga (JP); Takashi Yamamoto, Fukuoka (JP); Ken Ohbuchi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 62 days.

(21) Appl. No.: 15/226,784

(22) Filed: Aug. 2, 2016

(65) Prior Publication Data
US 2017/0041572 A1 Feb. 9, 2017

(30) Foreign Application Priority Data

Aug. 6, 2015 (JP) .................................. 2015-155870
Jun. 7, 2016 (JP) .................................. 2013-113746

(51) Int. Cl.
*H04N 7/18* (2006.01)
*H04M 1/02* (2006.01)
(Continued)

(52) U.S. Cl.
CPC .......... *H04N 7/186* (2013.01); *H04M 1/0291* (2013.01); *H04M 11/025* (2013.01);
(Continued)

(58) Field of Classification Search
None
See application file for complete search history.

(56) References Cited

U.S. PATENT DOCUMENTS 5,754,227 A * 5/1998 Fukuoka .............. H04N 1/2112
                                                        348/231.6
9,148,905 B2 * 9/2015 Matsuo ................. H04W 88/02
(Continued)

FOREIGN PATENT DOCUMENTS

JP          06-244791 A      9/1994
JP          10-257481 A      9/1998
(Continued)

OTHER PUBLICATIONS

Transistor Tech. Editor, RF World Transistor Extra Edition, "The World of Digital Mobile Phone Frequency Chart 6," CQ Publishing Co., May 1, 2013, No. 22 RF World, 2 pages.
(Continued)

*Primary Examiner* — Reza Aghevli
(74) *Attorney, Agent, or Firm* — Seed IP Law Group LLP

(57) ABSTRACT

There is provided an intercom system capable of reducing power consumption by stably performing wireless communication between a camera and a monitor. Monitor 200 checks whether or not a communication error occurs in image data received from camera 100, and checks whether or not there is a slot as a moving destination in an empty state in a case where the communication error occurs. In a case where there is no slot as the moving destination, monitor 200 controls the number of connected image calls by transmitting an image call disconnect request to camera 100. Accordingly, intercom system 10 varies image quality (a frame rate, a compression ratio, or an image size) depending on a radio wave status.

9 Claims, 14 Drawing Sheets

(51) Int. Cl.
*H04M 11/02* (2006.01)
*H04W 52/02* (2009.01)

(52) U.S. Cl.
CPC .... *H04W 52/0229* (2013.01); *H04M 2250/08* (2013.01); *Y02D 70/00* (2018.01); *Y02D 70/144* (2018.01); *Y02D 70/166* (2018.01)

(56) References Cited

U.S. PATENT DOCUMENTS

| | | | | |
|---|---|---|---|---|
| 9,661,685 | B2* | 5/2017 | Sugitani | H04W 84/20 |
| 2002/0099854 | A1* | 7/2002 | Jorgensen | H04L 1/20 |
| | | | | 709/249 |
| 2006/0286975 | A1* | 12/2006 | Sugitani | H04M 1/0291 |
| | | | | 455/426.1 |
| 2010/0034319 | A1* | 2/2010 | Ludvigsen | H04L 1/0071 |
| | | | | 375/340 |
| 2012/0086818 | A1* | 4/2012 | Yamamoto | H04N 5/23203 |
| | | | | 348/207.1 |
| 2012/0281101 | A1* | 11/2012 | Fujinawa | H04N 1/00127 |
| | | | | 348/207.1 |
| 2013/0003822 | A1* | 1/2013 | Margulis | H04L 12/2838 |
| | | | | 375/240.01 |
| 2013/0136059 | A1* | 5/2013 | Matsuo | H04W 88/02 |
| | | | | 370/328 |
| 2014/0301377 | A1* | 10/2014 | Sugitani | H04B 7/212 |
| | | | | 370/337 |
| 2014/0334375 | A1* | 11/2014 | Sugitani | H04W 84/20 |
| | | | | 370/315 |
| 2015/0145979 | A1* | 5/2015 | Tashiro | A61B 1/00016 |
| | | | | 348/65 |
| 2015/0223099 | A1* | 8/2015 | Fujiwara | G08B 13/19689 |
| | | | | 348/143 |
| 2016/0027401 | A1* | 1/2016 | Umehara | G02B 27/017 |
| | | | | 345/633 |
| 2016/0301867 | A1* | 10/2016 | Robinson | H04N 5/23241 |
| 2017/0041572 | A1* | 2/2017 | Kasedou | H04W 52/0229 |

FOREIGN PATENT DOCUMENTS

| | | | | |
|---|---|---|---|---|
| JP | 2007/142808 A | | 6/2007 | |
| JP | 2007142808 A | * | 6/2007 | ............ H04M 9/00 |
| JP | 2010-022041 A | | 1/2010 | |
| JP | 2013-110708 A | | 6/2013 | |
| JP | 2013-236393 A | | 11/2013 | |
| JP | 2014-075695 A | | 4/2014 | |

OTHER PUBLICATIONS

Extended European Search Report, dated Dec. 1, 2016, for corresponding EP Application No. 16183054.2—1972, 11 pages.

* cited by examiner

INTERCOM SYSTEM

BACKGROUND

1. Technical Field

The present disclosure relates to an intercom system.

2. Description of the Related Art

Consciousness of crime prevention is improved every year, and there has recently been an increasing need for realization of a camera with simple installation at low cost in a single-person household such as a one-room condominium as well as a detached house.

In order to meet the need for the realization of the camera with simple installation at a low cost, an intercom system that does not require wiring between a camera and a monitor by performing wireless communication between the camera and the monitor has come into wide use. For example, Japanese Patent Unexamined Publication No. 2007-142808 discloses an intercom system that performs wireless communication using Bluetooth (registered trademark) between the camera and the monitor.

However, since the intercom system disclosed in Japanese Patent Unexamined Publication No. 2007-142808 described above is able to perform high-speed data communication but is specialized in near-field communication, radio waves are attenuated depending on a distance between the camera and the monitor or a structure (a wall or a column of a house) between the camera and the monitor, and it is difficult to perform communication. Thus, power consumption may be increased in some cases.

SUMMARY

An object of the present disclosure is to provide an intercom system capable of reducing power consumption by stably performing wireless communication between a camera and a monitor. An intercom system according to an aspect of the present disclosure is an intercom system that performs DECT wireless communication by using a time-division multiplexing communication method between a camera and a monitor. The intercom system has a configuration in which the monitor receives image data from the camera with first image quality to display the received image data, and receives image data from the camera with second image quality lower than the first image quality to display the received image data if a communication error occurs.

According to the present disclosure, it is possible to reduce power consumption by stably performing the wireless communication between the camera and the monitor.

DETAILED DESCRIPTION OF THE PREFERRED EMBODIMENTS

Hereinafter, exemplary embodiments of the present disclosure will be described in detail with reference to the drawings.

Exemplary Embodiment 1

Figure 1:
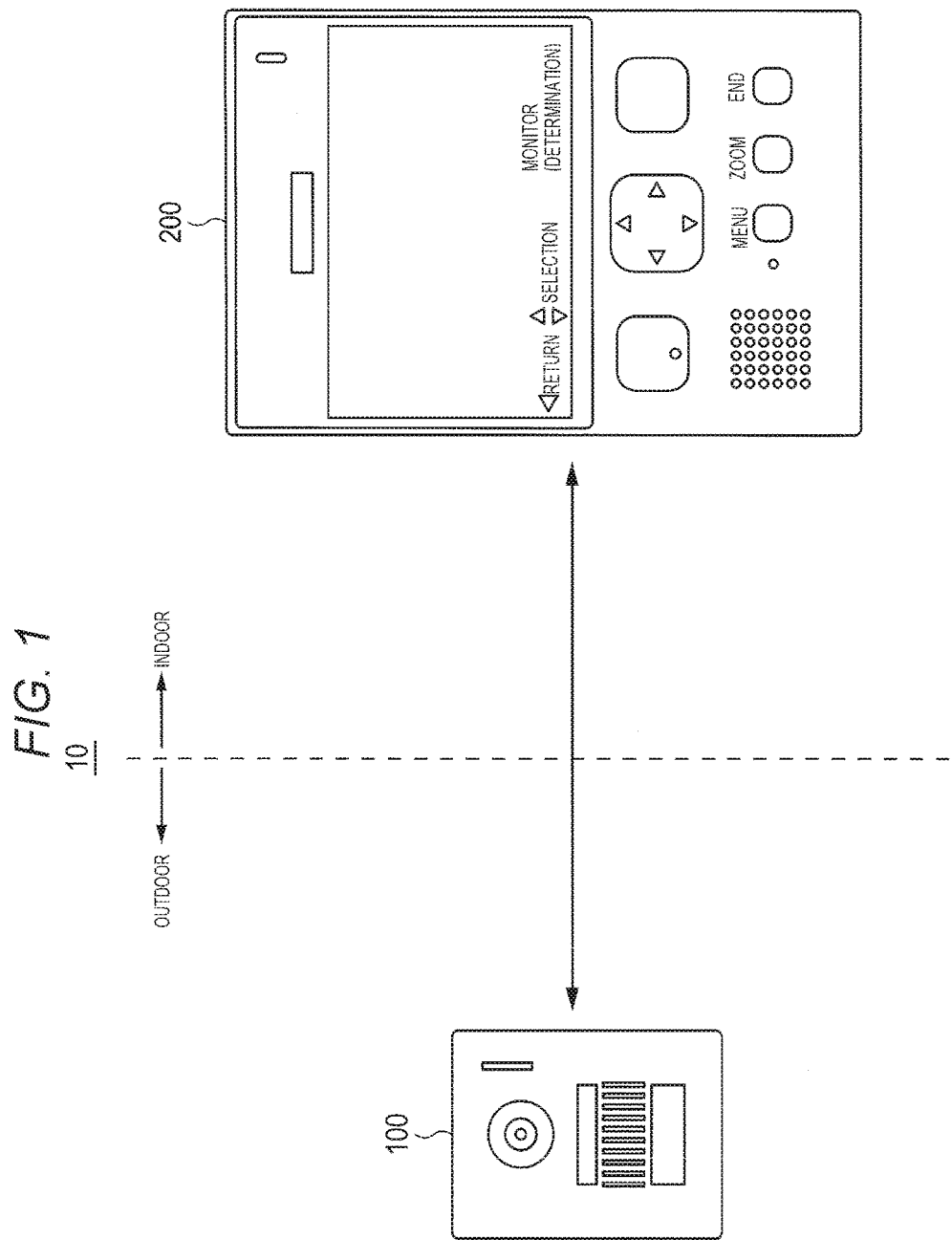
FIG. 1 is a diagram showing an intercom system according to Exemplary Embodiment 1.

FIG. 1 is a diagram showing intercom system 10 according to Exemplary Embodiment 1. As shown in FIG. 1, intercom system 10 includes camera 100, and monitor 200. For example, camera 100 is provided near an entrance door, and monitor 200 is provided indoors. A structure such as a wall of a house is present between camera 100 and monitor 200.

Figure 2:
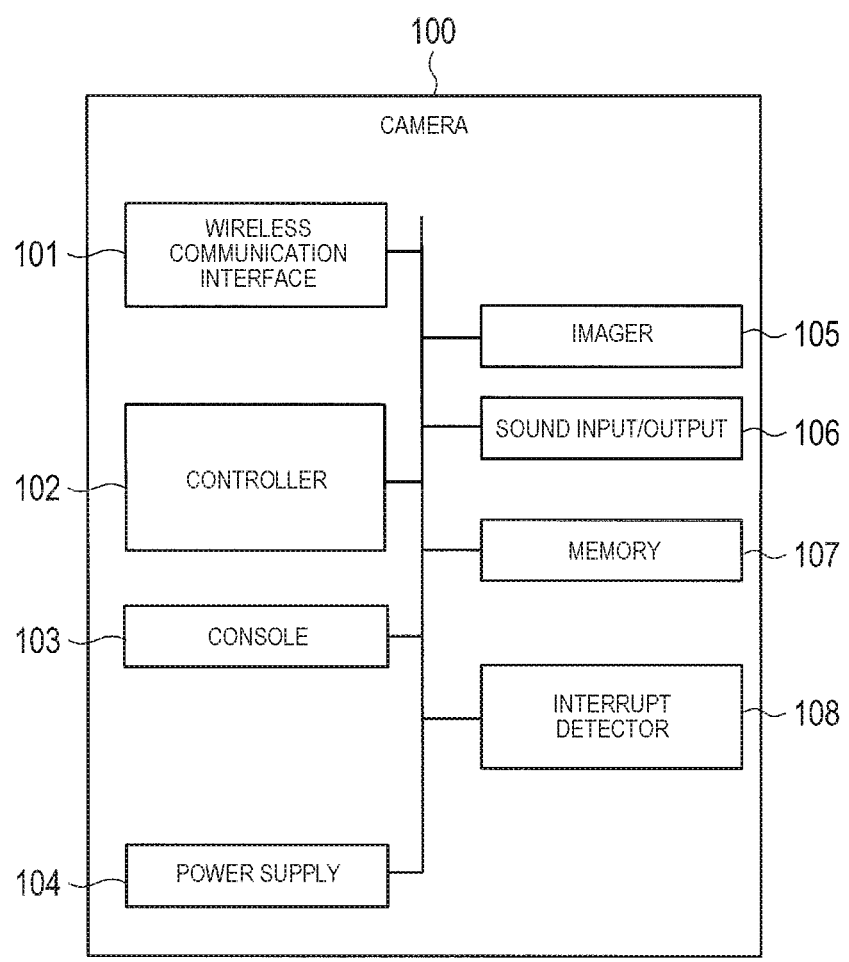
FIG. 2 is a block diagram showing a configuration example of a camera according to Exemplary Embodiment 1.

FIG. 2 is a block diagram showing a configuration example of camera 100 according to Exemplary Embodiment 1.

<Configuration of Camera>

Camera 100 includes wireless communication interface 101, controller 102, console 103, power supply 104, imager 105, sound input-output 106, memory 107, and interrupt detector 108.

Wireless communication interface 101 communicates with monitor 200 through a wireless line. A communication method performed by wireless communication interface 101 is a time-division multiplexing communication method, such as Digital enhanced Cordless Telecommunications (DECT), which uses a frequency band of a 1.9 GHz band such as 1880 MHz to 1930 MHz. According to this communication method, a communication time with monitor 200 is limited by providing a sleep state, and thus, power consumption can be reduced and radio waves can be sent over a relatively long distance due to the characteristics of the frequency band. In the following description, an example in which the DECT method is used as the communication method will be described.

Wireless communication interface 101 transmits data of an image (hereinafter, referred to as an "imaged image") imaged by imager 105 to monitor 200 by the DECT method. Accordingly, a resident indoors can visually recognize a visitor present near the entrance door. Wireless communication interface 101 transmits sound information including the sound of the visitor collected by sound input-output 106 of camera 100 to monitor 200 by the DECT method. Wireless communication interface 101 receives sound information including the sound of the resident from monitor 200 by the DECT method. Accordingly, the visitor outdoors and the resident indoors can communicate with each other.

Controller 102 includes a read-only memory (ROM), a random-access memory (RAM), and a central processing unit (CPU). For example, the CPU executes programs retained in the ROM, and thus, various functions of controller 102 are realized.

Controller 102 manages entire camera 100, and performs various controlling, arithmetic processing and determining. Controller 102 performs arithmetic processing for controlling the respective units of camera 100.

Console 103 is, for example, a doorbell button, and notifies monitor 200 of the presence of the visitor through wireless communication interface 101 if the console is pressed by the visitor.

Power supply 104 supplies power for operating camera 100 to the respective units. Power supply 104 is a primary battery or a secondary battery in consideration of installation. However, power supply 104 is not limited to the above-mentioned configuration, and power may be input from an AC power supply or an AC adapter through a power cable.

Imager 105 images a predetermined space outdoors. The image imaged by imager 105 includes, for example, a moving image and a still image, and the imaged image includes a visitor, a passerby, a suspicious person, and an object other than a person.

Sound input-output 106 is a microphone and a speaker, and collects sound information including the sound of the visitor, and transmits the collected sound information to monitor 200 through wireless communication interface 101. Sound input-output 106 outputs sound information including the sound of the resident transmitted from monitor 200.

Memory 107 is a flash memory, and stores, for example, setting information and device information such as an identification number of camera 100, state information of monitor 200, and image data before the transmission to monitor 200 is performed.

Interrupt detector 108 detects a key interrupt such as a button provided in camera 100, an interrupt due to a timer, and interrupts due to various events. The detection of the interrupt includes the detection performed by hardware and the detection performed by software.

Interrupt detector 108 has a function of controlling the supplying of power to the respective units from power supply 104 in order to realize ultra-low power consumption. For example, interrupt detector 108 is positioned between the respective units such as controller 102 and power supply 104 on a circuit, and only interrupt detector 108 is constantly operated by weak power of power supply 104. Interrupt detector 108 turns ON or OFF a switching element based on the detection of a predetermined interrupt in order to supply power to the respective units.

<Configuration of Monitor>

Figure 3:
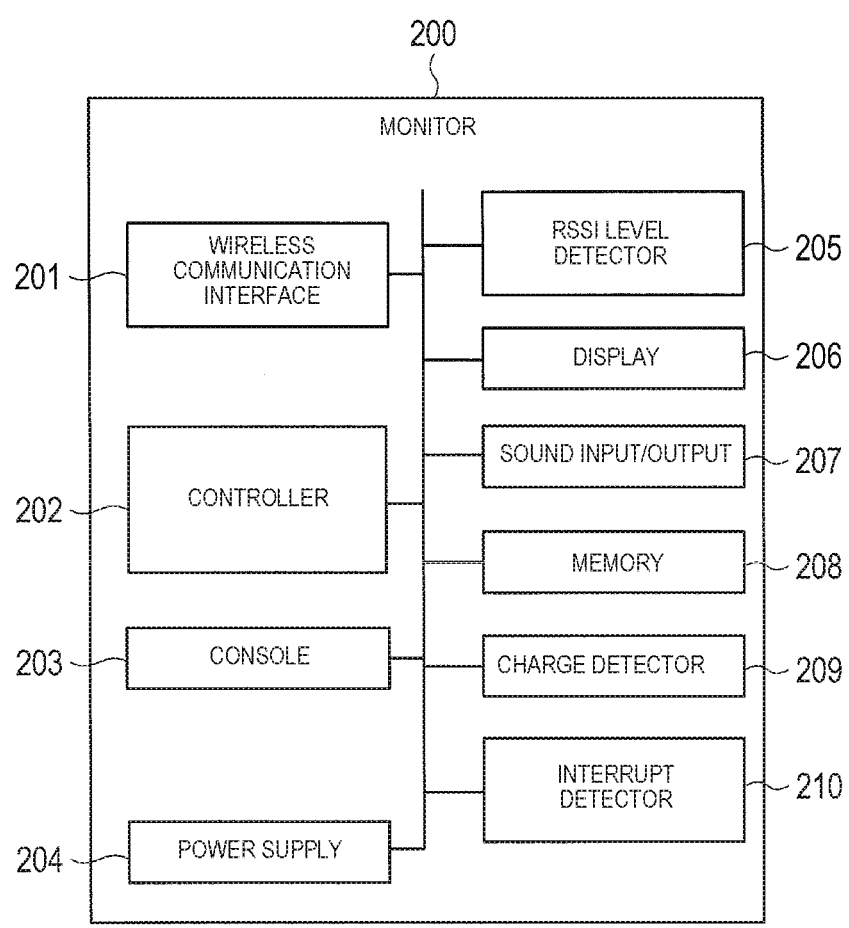
FIG. 3 is a block diagram showing a configuration example of a monitor according to Exemplary Embodiment 1.

FIG. 3 is a block diagram showing a configuration example of monitor 200 according to Exemplary Embodiment 1.

Monitor 200 includes wireless communication interface 201, controller 202, console 203, power supply 204, RSSI level detector 205, display 206, sound input-output 207, memory 208, charge detector 209, and interrupt detector 210.

Wireless communication interface 201 communicates with camera 100 through a wireless line. A communication method performed by wireless communication interface 201 is a DECT method (a time-division multiplexing communication method that uses a frequency band of 1.9 GHz band such as 1880 MHz to 1930 MHz). According to this communication method, a communication time with camera 100 is limited by providing a sleep state, and thus, power consumption can be reduced and radio waves can be sent over a relatively long distance due to the characteristics of the frequency band. Wireless communication interface 201 transmits a reference control signal every constant cycle.

Wireless communication interface 201 receives image data transmitted from camera 100 by the DECT method. Accordingly, the resident indoors can visually recognize the visitor present near the entrance door. Wireless communication interface 201 receives sound information including the sound of the visitor from camera 100 by the DECT method. Wireless communication interface 201 transmits sound information including the sound of the resident which is collected by sound input-output 207 of monitor 200 to camera 100 by the DECT method. Accordingly, the visitor outdoors and the resident indoors can communicate with each other.

Controller 202 includes a ROM, a RAM and a CPU. For example, the CPU executes programs retained in the ROM, and thus, various functions of controller 202 are realized.

Controller 202 manages entire monitor 200, and performs various controlling, arithmetic processing and determining. Controller 202 performs arithmetic processing for controlling the respective units of monitor 200.

Particularly, controller 202 checks radio wave status by using an image call connection request received from camera 100, and controls the number of connected image calls by transmitting an image call connection reply to camera 100 in a case where the radio wave status is favorable and transmitting an image call connection refusal reply to camera 100 in a case where the radio wave status is deteriorated. Accordingly, intercom system 10 can vary the transmission rate of the image data. In the present exemplary embodiment, the number of slots and number of channels for use in the communication may be increased or decreased instead of the number of image calls.

Console 203 includes various buttons, and includes, for example, a reply button for replying in a case where the presence of the visitor is notified from camera 100, a monitor button for acquiring image data from camera 100, and a button for controlling camera 100.

Power supply 204 supplies power for operating monitor 200 to the respective units. As power supply 204, there are a case where power is input from an AC power supply or an AC adapter and a case where the power supply is a primary battery or a secondary battery in consideration of installation.

RSSI level detector 205 detects the strength of a signal received by wireless communication interface 201 from camera 100, that is, a received signal strength indicator level.

Display 206 includes, for example, a liquid crystal display (LCD), and displays various characters or images. The image includes, for example, a moving image and a still image, and includes an imaged image from camera 100 and an image for operating monitor 200.

Sound input-output 207 is a microphone and a speaker, and collects sound information including the sound of the resident, and transmits the collected sound information to camera 100 through wireless communication interface 201. Sound input-output 207 outputs sound information including the sound of the visitor which is transmitted from camera 100.

Memory 208 is a flash memory, and includes various images or sounds, and other management information. The image includes, for example, a moving image and a still image, and includes an imaged image from camera 100 and an image for operating monitor 200. The sound includes, for example, sound of a routine message produced from monitor 200.

The other management information includes, for example, password information set such that various setting information of monitor 200 is not arbitrarily changed.

Charge detector 209 detects whether or not monitor 200 is mounted on a charging stand and power supply 204 is connected to an external power supply.

Interrupt detector 210 detects a key interrupt such as a button provided in monitor 200, an interrupt due to a timer, and interrupts due to various events. The detection of the interrupt includes the detection performed by hardware and the detection performed by software.

Interrupt detector 210 has an ultra-low power consumption mode for controlling the supplying of power to the respective units from power supply 204 in order to realize ultra-low power consumption. For example, interrupt detector 210 is positioned between the respective units such as controller 202 and power supply 204 on a circuit, and only interrupt detector 210 is constantly operated by weak power of power supply 204. Interrupt detector 210 turns ON or OFF a switching element based on the detection of a predetermined interrupt in order to supply power to the respective units.

<Connection Procedure>

Figure 4:
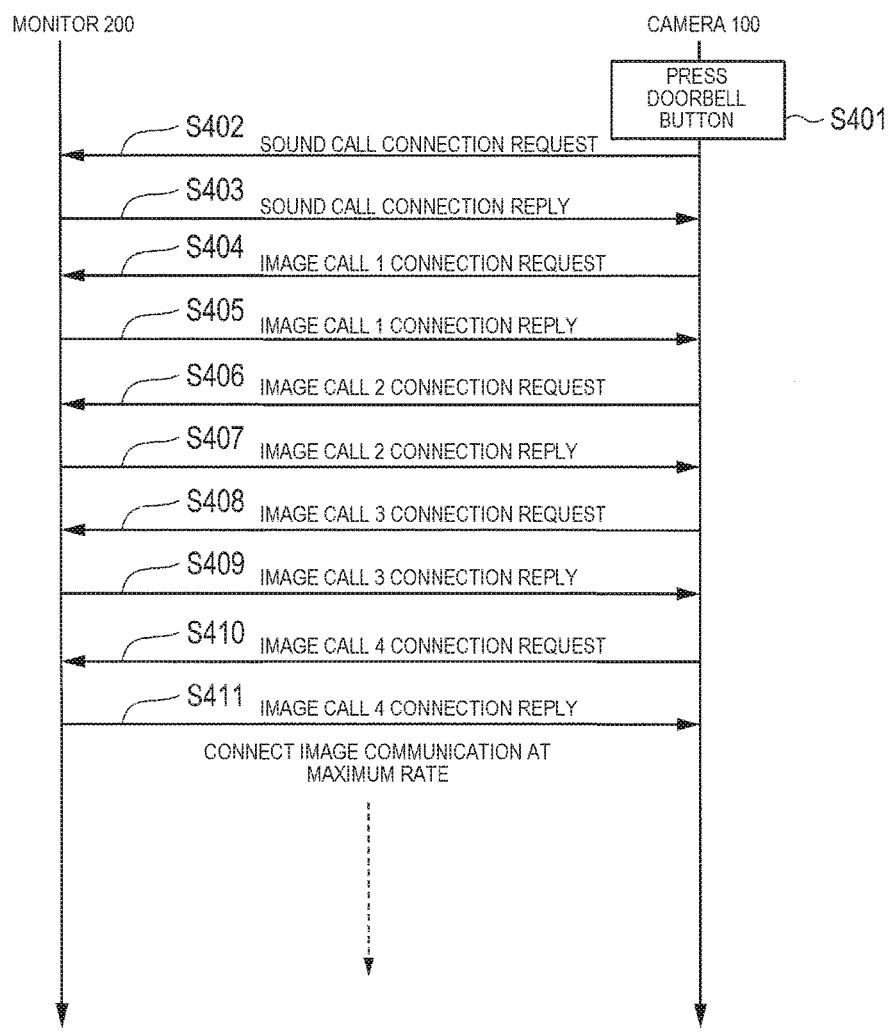
FIG. 4 is a sequence diagram showing a procedure in which a doorbell button of the camera is pressed and the camera and the monitor are connected in Exemplary Embodiment 1.

Hereinafter, a connection procedure for allowing camera 100 and monitor 200 to be wirelessly connected will be described. FIG. 4 is a sequence diagram showing a procedure in which the doorbell button of camera 100 is pressed and camera 100 and monitor 200 are connected. Although not shown in FIG. 4, monitor 200 periodically transmits a reference control signal.

If the doorbell button of camera 100 is pressed and camera 100 searches for the reference control signal transmitted from monitor 200 to establish communication synchronization in step S401, camera 100 transmits a sound call connection request to monitor 200 in step S402. In step S403, monitor 200 transmits a sound call connection reply to camera 100. Accordingly, the camera notifies monitor 200 that the visitor visits.

Camera 100 transmits an image call 1 connection request to monitor 200 in step S404, and monitor 200 transmits an image call 1 connection reply to camera 100 in step S405.

Similarly, in steps S406 to S411, connection requests and connection replies for image calls 2 to 4 are transmitted and received between camera 100 and monitor 200.

Here, since a case where the image calls are four and all the image calls are connected is shown, camera 100 and monitor 200 can transmit and receive the image data at a maximum transmission rate.

Figure 5:
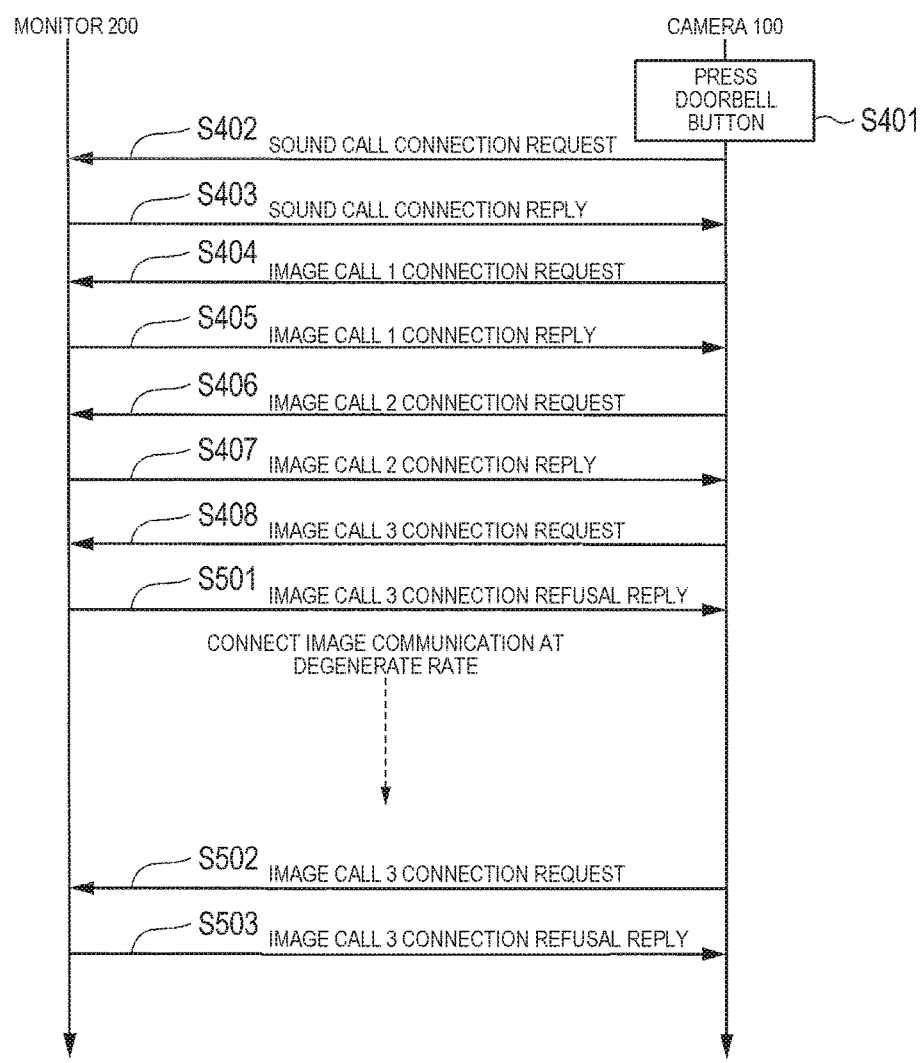
FIG. 5 is a sequence diagram showing another procedure in which the doorbell button of the camera is pressed and the camera and the monitor are connected in Exemplary Embodiment 1.

FIG. 5 is a sequence diagram showing another procedure in which the doorbell button of camera 100 is pressed and camera 100 and monitor 200 are connected. However, the portions in FIG. 5 common to those in FIG. 4 will be assigned the same reference numerals as those in FIG. 4, and the redundant description thereof will be omitted.

In step S408, camera 100 transmits the image call 3 connection request to monitor 200. At this time, in a case where the radio wave status is deteriorated due to radio wave interference, monitor 200 transmits an image call 3 connection refusal reply to camera 100 in step S501. As mentioned above, in intercom system 10, the number of connected image calls is increased or decreased depending on the radio wave status, and the transmission rate of the image data is varied. The number of slots and number of channels for use in the communication may be increased or decreased instead of the number of image calls.

As a result, camera 100 and monitor 200 transmit and receive the image data at a degenerate transmission rate. After a predetermined time elapses from the reception of the image call 3 connection refusal reply by camera 100, the expansion of the transmission rate is requested again. That is, in step S502, camera 100 transmits the image call 3 connection request to monitor 200. Here, it is assumed that monitor 200 transmits the image call 3 connection refusal reply to camera 100 in step S503.

Figure 6:
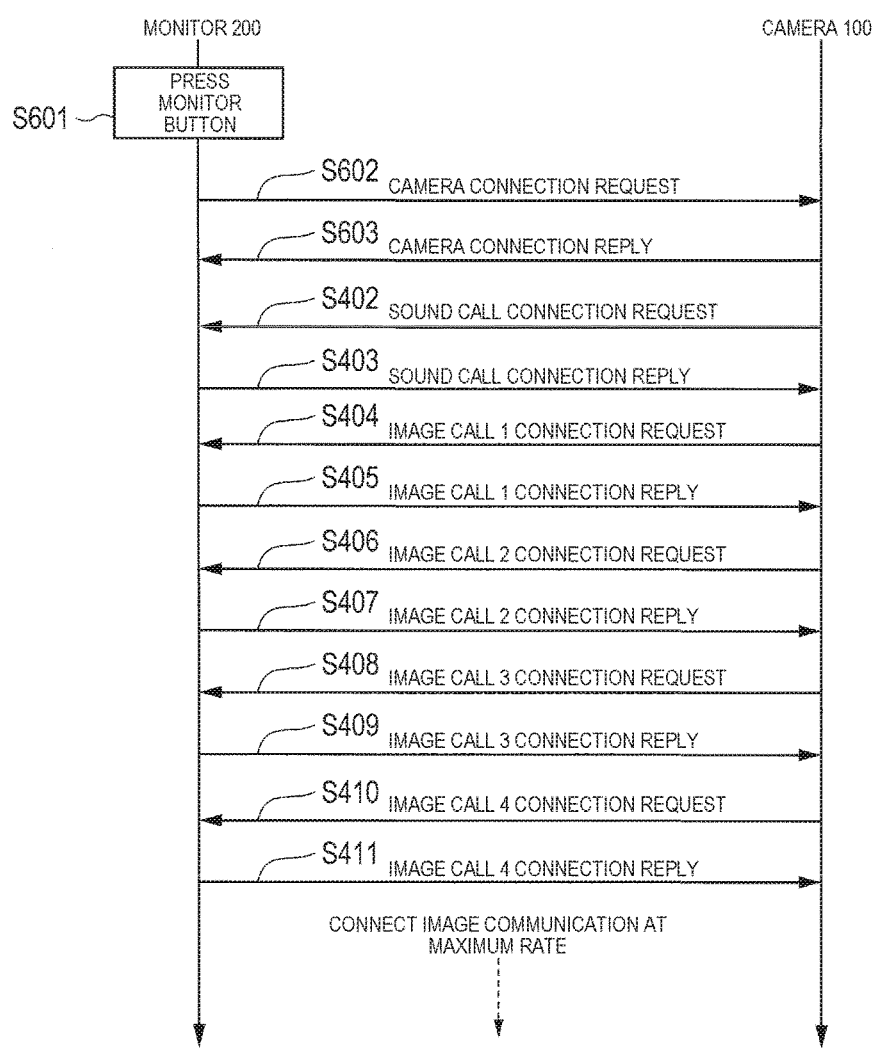
FIG. 6 is a sequence diagram showing a procedure in which a monitor button of the monitor is pressed and the camera and the monitor are connected in Exemplary Embodiment 1.

FIG. 6 is a sequence diagram showing a procedure in which the monitor button of monitor 200 is pressed and camera 100 and monitor 200 are connected. However, the portions in FIG. 6 common to those in FIG. 4 will be assigned the same reference numerals as those in FIG. 4, and the redundant description thereof will be omitted. Although not shown in FIG. 6, monitor 200 periodically transmits the reference control signal. For example, in a case where camera 100 is driven by a battery, camera 100 may constantly receive the reference control signal in the sleep state, and may release the sleep state at regular intervals to receive the reference control signal. In such a configuration, even in a case where camera 100 is driven by the battery, it is possible to perform a monitoring operation from monitor 200 while reducing the power consumption of camera 100.

If the monitor button of monitor 200 is pressed and camera 100 searches for the reference control signal transmitted from monitor 200 to establish communication synchronization in step S601, monitor 200 transmits a camera connection request to camera 100 in step S602. Camera 100 transmits a camera connection reply to monitor 200 in step S603, and the procedure from steps S402 to S411 is performed.

Figure 7:
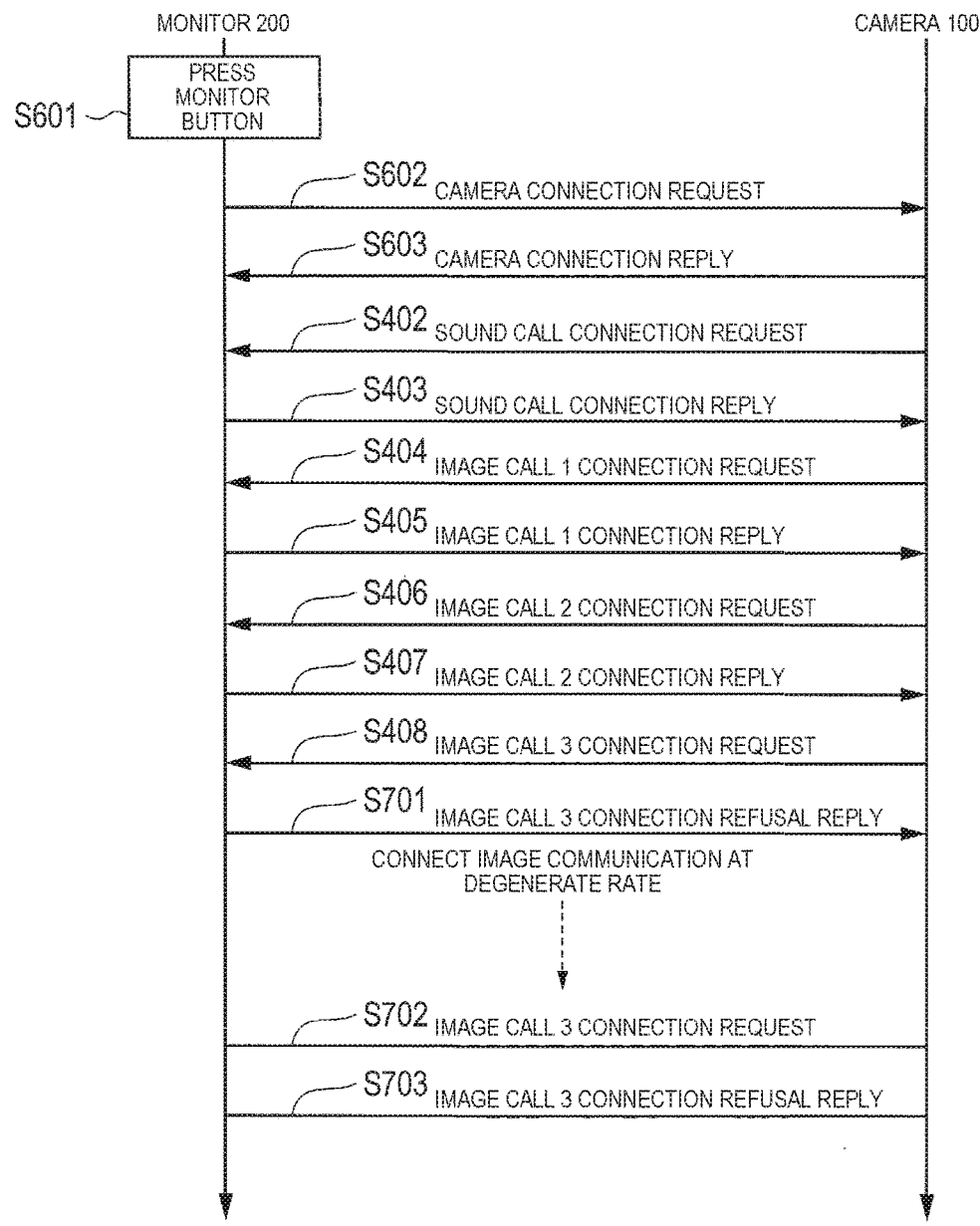
FIG. 7 is a sequence diagram showing another procedure in which the monitor button of the monitor is pressed and the camera and the monitor are connected in Exemplary Embodiment 1.

FIG. 7 is a sequence diagram showing another procedure in which the monitor button of monitor 200 is pressed and camera 100 and monitor 200 are connected. However, the portions in FIG. 7 common to those in FIG. 6 will be assigned the same reference numerals as those in FIG. 6, and the redundant description thereof will be omitted.

In step S408, camera 100 transmits an image call 3 connection request to monitor 200. At this time, in a case where the radio wave status is deteriorated due to radio wave interference, monitor 200 transmits an image call 3 connection refusal reply to camera 100 in step S701. As stated above, in intercom system 10, the number of connected image calls is increased or decreased depending on the radio wave status, and the transmission rate of the image data is varied. The number of slots and number of channels for use in the communication may be increased or decreased instead of the number of image calls.

As a result, camera 100 and monitor 200 transmit and receive the image data at a degenerate transmission rate. After a predetermined time elapses from the reception of the image call 3 connection refusal reply by camera 100, the expansion of the transmission rate is requested again. That is, in step S702, camera 100 transmits the image call 3 connection request to monitor 200. Here, it is assumed that monitor 200 transmits the image call 3 connection refusal reply to camera 100 in step S703.

Although it has been described in the connection procedure shown in FIGS. 4 to 7 that the image call is connected after the sound call is connected, the image call may be connected, and the sound call may be connected after the camera notifies monitor 200 that visitor visits.

Figure 8:
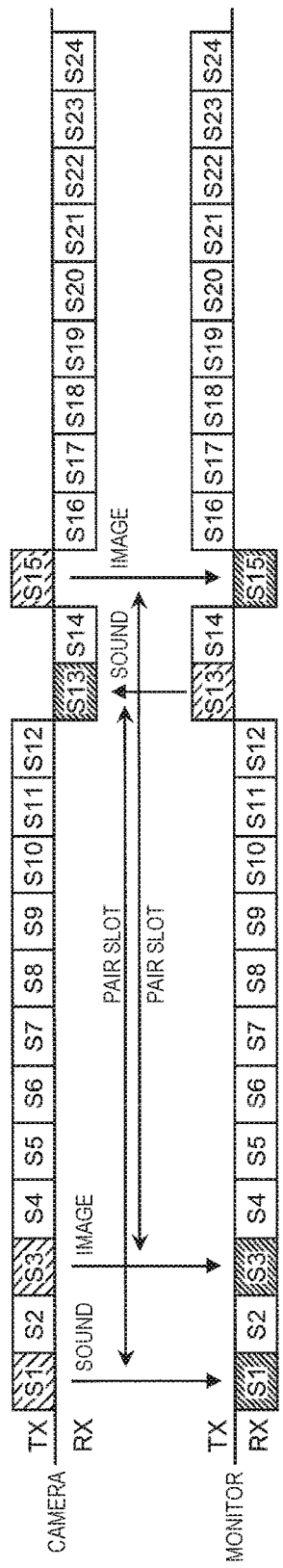
FIG. 8 shows an example of the assignment of slots in one frame.

Hereinafter, a slot utilization example in the DECT method will be described. FIG. 8 shows an example of the assignment of slots in one frame. In FIG. 8, an example in which one frame includes 24 slots of slots S1 to S24 is shown. Here, slot S1 is assigned to the transmission of sound data from camera 100, and slot (pair slot) S13 paired with slot S1 is assigned to the transmission of sound data from monitor 200. That is, symmetric communication is used in sound communication.

Slot S3 is assigned to the transmission of image data from camera 100, and slot (pair slot) S15 paired with slot S3 is also assigned to the transmission of image data from camera 100. That is, asymmetric communication is used in image communication.

Slots S4 to S12 are in the sleep state. The power consumption of camera 100 is controlled by providing the sleep state at regular intervals, and camera 100 can be driven by the battery. Intercom system 10 may have a mode in which the sleep state is extended, and in this case, the power consumption of camera 100 can be further suppressed. Only in a case where the doorbell button of camera 100 is pressed, intercom system 10 may have a mode in which monitor 200 replies, and in this case, the power consumption of camera 100 can be further suppressed.

When the communication with the camera is started, the monitor of intercom system 10 checks whether or not there is a slot in an empty state, selects a slot to be used in communication from the slots checked to be in the empty state to notify the camera of the selected slot, and establishes the communication with the camera.

In a case where there is a plurality of cameras, the monitor of intercom system 10 may assign slot S1 to a first camera, may assign slot S2 to a second camera, and may assign slot Sn to an n-th camera. Accordingly, monitor 200 can communicate with the plurality of cameras.

In a case where there is a plurality of monitors, intercom system 10 may assign slot S1 to a first monitor, may assign slot S2 to a second monitor, and may assign slot Sn to an n-th monitor. Accordingly, camera 100 can communicate with the plurality of monitors.

Figure 9:
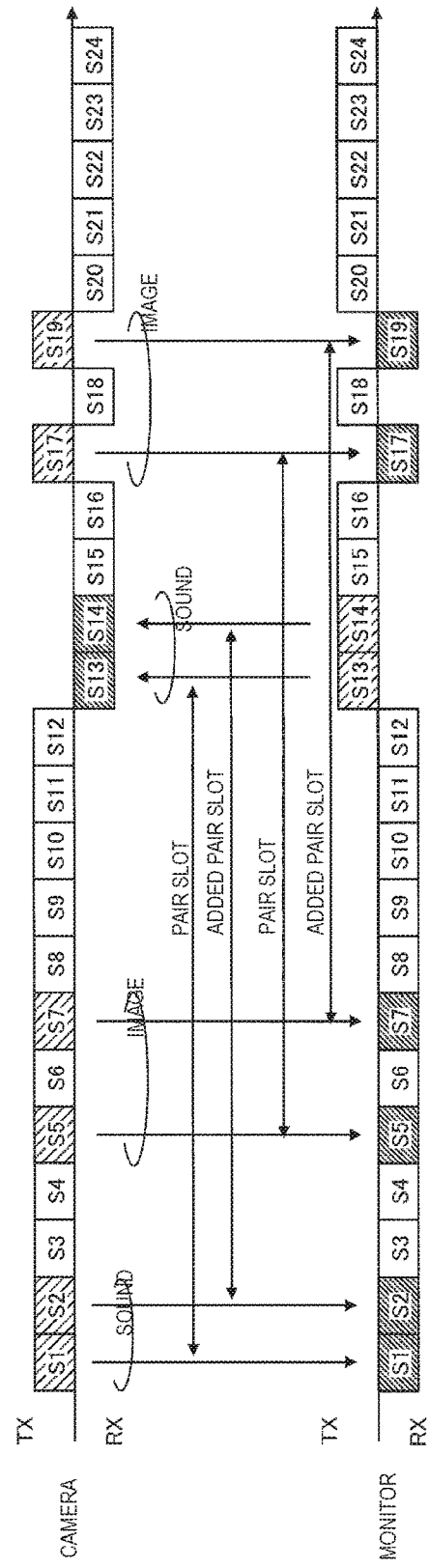
FIG. 9 shows another example of the assignment of slots in one frame.

As shown in FIG. 9, intercom system 10 may assign a plurality of pair slots to one camera in the sound communication or image communication. In FIG. 9, slot S1 is assigned to the transmission of the sound data from camera 100, and slot (pair slot) S13 paired with slot S1 is assigned to the transmission of the sound data from monitor 200. Slot S2 is assigned to the transmission of the sound data from camera 100, and slot (added pair slot) S14 paired with slot S2 is assigned to the transmission of the sound data from monitor 200.

Slot S5 is assigned to the transmission of the image data from camera 100, and slot (pair slot) S17 paired with slot S5 is also assigned to the transmission of the image data from camera 100. Slot S7 is assigned to the transmission of the image data from camera 100, and slot (added pair slot) S19 paired with slot S7 is also assigned to the transmission of the image data from camera 100.

As mentioned above, according to the present exemplary embodiment, since the frequency band such as 1.9 GHz band and the time-division multiplexing communication method such as the DECT method is used in the wireless communication between camera 100 and monitor 200, even though the distance between camera 100 and monitor 200 is long or a radio wave shielding effect of a structure between camera 100 and monitor 200 is high, the wireless communication between camera 100 and monitor 200 can be stably performed due to the frequency characteristics, and the power consumption can be reduced by appropriately setting these devices in the sleep state. In a case where the application of the intercom system to an indoor propagation model based on ITU-RP.1238-6 is considered, a communication distance at which communication can be stably performed is about 30 m if a frequency band such as a 2.4 GHz band in which high-speed communication can be performed is used, and is about 80 m if the frequency band of 1.9 GHz band is used. Accordingly, the use of the frequency band of 1.9 GHz band is appropriate to practically use the intercom system through wireless communication in many living spaces. The time-division multiplexing communication method capable of performing the asymmetric communication using the plurality of slots in the image communication in which the data amount is large is appropriate to practically use the intercom system through the wireless communication.

The intercom system through the wireless communication has a strong point of the ease of installation due to the battery driving. In order to realize the battery driving, a communication method capable of operating the system with low power consumption, that is, a time-division multiplexing communication method in which time-division multiplexing is performed on a communication section, power is supplied to only a section which requires power (ON operation) and a section which does not require power is operated in the sleep state is appropriate. In the system in which the camera is constantly in the sleep state and is operated only in a case where an interrupt signal is generated, another communication method may be used. However, in the system that performs the image communication by wirelessly notifying the camera by the monitor, since both the monitor and the camera are started at regular intervals and the camera needs to monitor the notification from the monitor at regular intervals, the time-division multiplexing communication method capable of performing time management is appropriate.

Exemplary Embodiment 2

Hereinafter, Exemplary Embodiment 2 will be described. In Exemplary Embodiment 2, the configuration of the intercom system, the configuration of the camera and the configuration of the monitor are common to those in Exemplary Embodiment 1, and the description thereof will be omitted. Monitor 200 according to Exemplary Embodiment 2 is different from monitor 200 according to Exemplary Embodiment 1 in that the processing content of controller 202 is different.

In the present exemplary embodiment, controller 202 controls the number of connected image calls by checking whether or not a communication error occurs in the image data received from camera 100 and transmitting a slot movement request or an image call disconnect request to camera 100 in a case where the communication error occurs. Accordingly, intercom system 10 can vary image quality (a frame rate, a compression ratio, or an image size) depending on the radio wave status.

<Connection Procedure>

Figure 10:
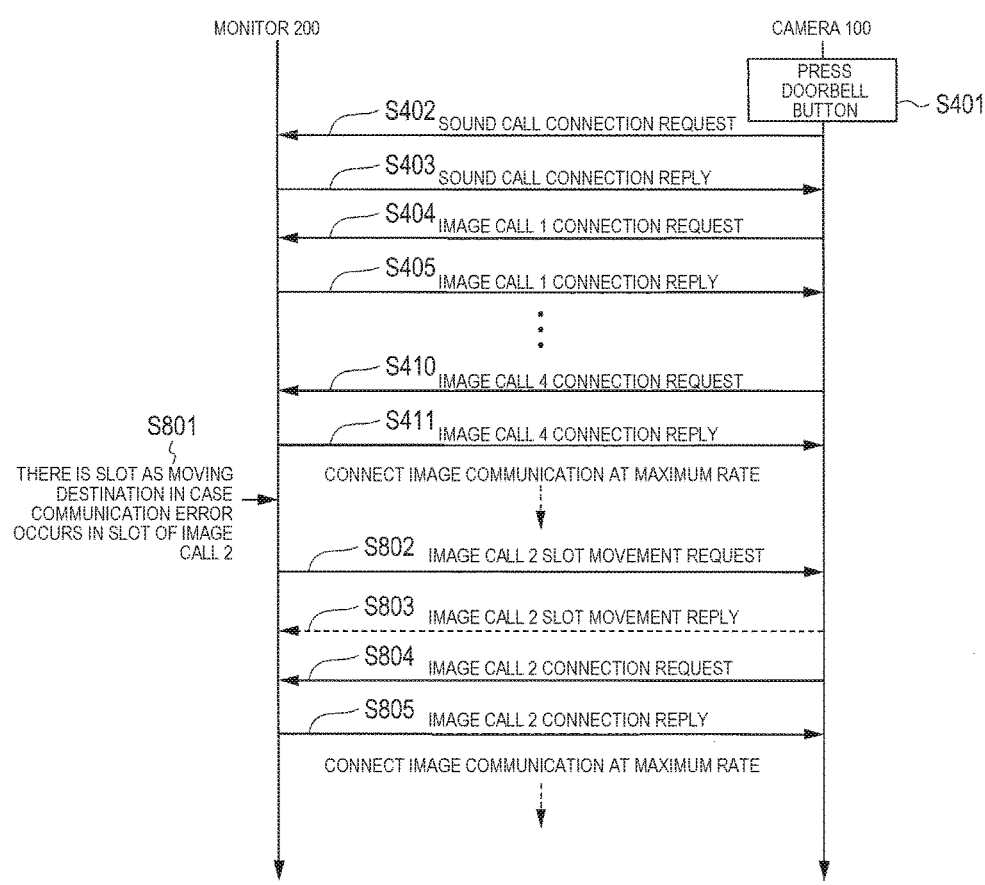
FIG. 10 is a sequence diagram showing a procedure in which a doorbell button of a camera is pressed and the camera and a monitor are connected in Exemplary Embodiment 2.

Hereinafter, a connection procedure for causing camera 100 and monitor 200 to be wirelessly connected according to the present exemplary embodiment will be described. FIG. 10 is a sequence diagram showing a procedure in which the doorbell button of camera 100 is pressed and camera 100 and monitor 200 are connected. The portions in FIG. 10 common to those in FIG. 4 will be assigned the same reference numerals as those in FIG. 4, and the redundant description thereof will be omitted.

Steps S401 to S411 in FIG. 10 are common to those in FIG. 4, and connection requests and connection replies for sound calls and image calls 1 to 4 are transmitted and received between camera 100 and monitor 200. In FIG. 10, a case where the number of image calls are 4 and all the image calls are connected is shown.

Thereafter, it is assumed that a communication error occurs in a slot of the image call 2. In this case, monitor 200 checks whether or not there is a slot as a moving destination in the empty state. In FIG. 10, a case where there is the slot as the moving destination (S801) is shown. In this case, monitor 200 transmits an image call 2 slot movement request to camera 100 in step S802, and camera 100 transmits an image call 2 slot movement reply to monitor 200 in step S803. Accordingly, the communication slot is moved.

Subsequently, camera 100 transmits the image call 2 connection request to monitor 200 again after a predetermined time elapses from the transmission of the image call 2 slot movement reply in step S804. In step S805, monitor 200 transmits the image call 2 connection reply to camera 100. In this case, camera 100 and monitor 200 can continue to transmit and receive the image data at a maximum transmission rate.

Figure 11:
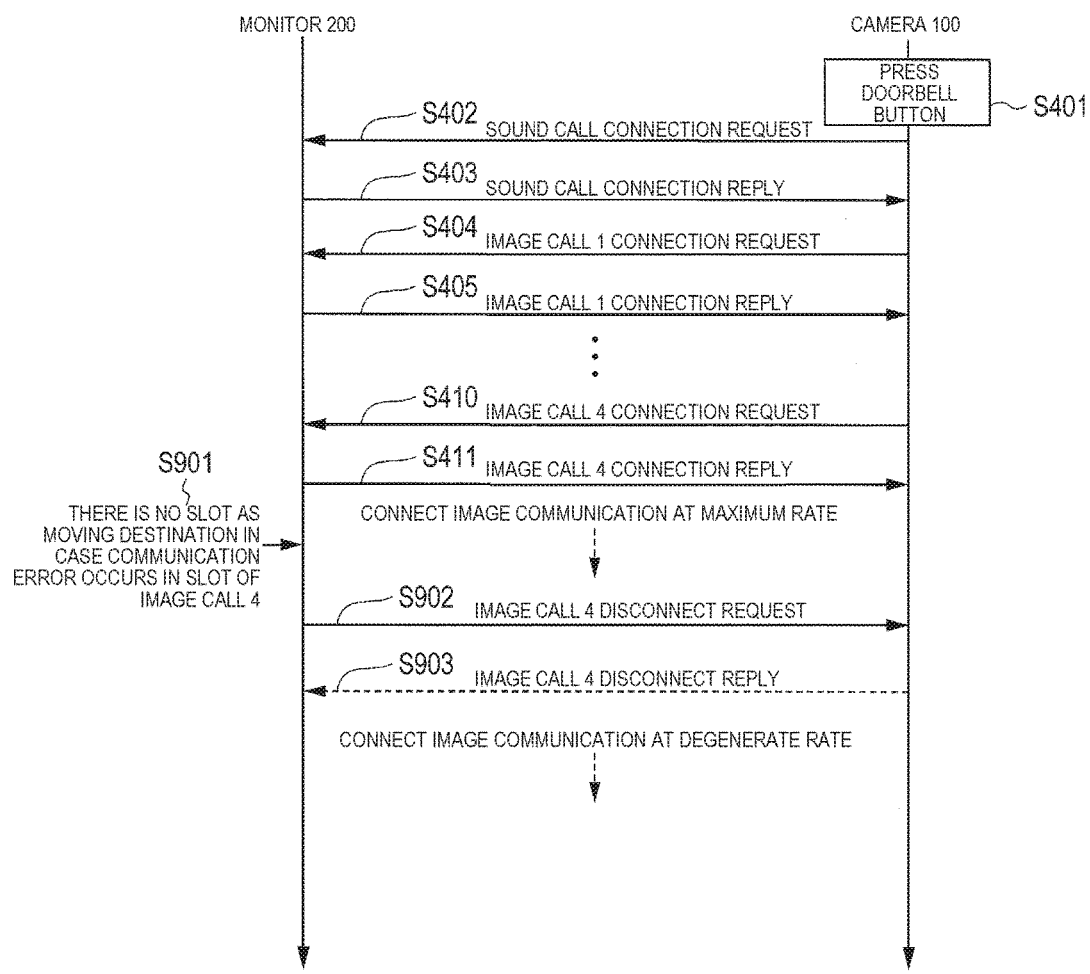
FIG. 11 is a sequence diagram showing another procedure in which the doorbell button of the camera is pressed and the camera and the monitor are connected in Exemplary Embodiment 2.

FIG. 11 is a sequence diagram showing another procedure in which the doorbell button of camera 100 is pressed and camera 100 and monitor 200 are connected. However, the portion in FIG. 11 common to those in FIG. 10 will be assigned the same reference numerals as those in FIG. 10, and the redundant description thereof will be omitted.

In FIG. 11, it is assumed that a communication error occurs in a slot of the image call 4 after step S411. In this case, monitor 200 checks whether or not there is a slot as a moving destination in an empty state. In FIG. 11, a case where there is no slot as the moving destination is shown (S901). In this case, monitor 200 transmits an image call 4 disconnect request to camera 100 in step S902, and camera 100 transmits an image call 4 disconnect reply to monitor 200 in step S903. As a result, camera 100 and monitor 200 transmit and receive the image data at a degenerate transmission rate.

As mentioned above, in the present exemplary embodiment, in a case where the communication error occurs, the number of connected image calls is increased or decreased depending on the presence or absence of the empty slot, and the transmission rate of the image data is varied. The number of slots and number of channels for use in the communication may be increased or decreased instead of the number of image calls.

Figure 12:
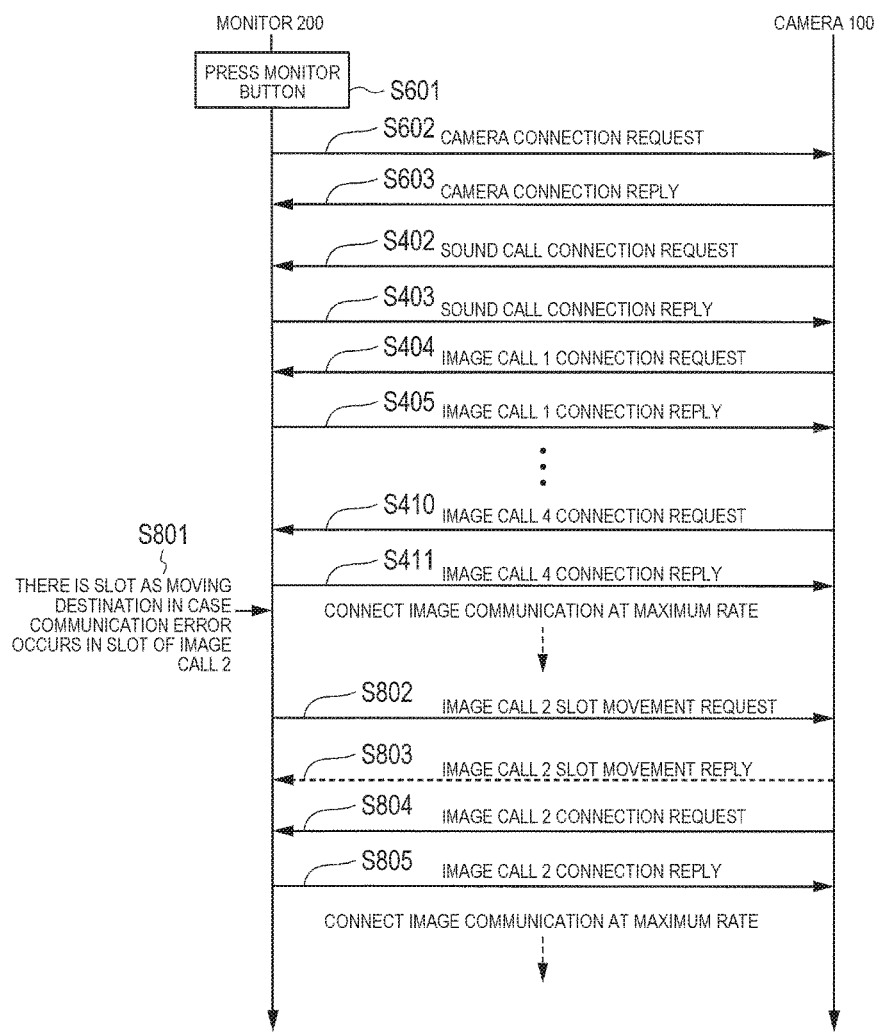
FIG. 12 is a sequence diagram showing a procedure in which a monitor button of the monitor is pressed and the camera and the monitor are connected in Exemplary Embodiment 2.

FIG. 12 is a sequence diagram showing a procedure in which the monitor button of monitor 200 is pressed and camera 100 and monitor 200 are connected. However, the portions in FIG. 12 common to those in FIGS. 6 and 10 will be assigned the same reference numerals as those in FIGS. 6 and 10, and the redundant description thereof will be omitted.

Steps S601 to S603 and S402 to S411 in FIG. 12 are common to those in FIG. 6, and connection requests and connection replies for sound calls and image calls 1 to 4 are transmitted and received between camera 100 and monitor 200. In FIG. 12, a case where the number of image calls are 4 and all the image calls are connected is shown.

Steps S801 to S805 in FIG. 12 are common to those in FIG. 10, and in this case, camera 100 and monitor 200 can continue to transmit and receive the image data at a maximum transmission rate.

Figure 13:
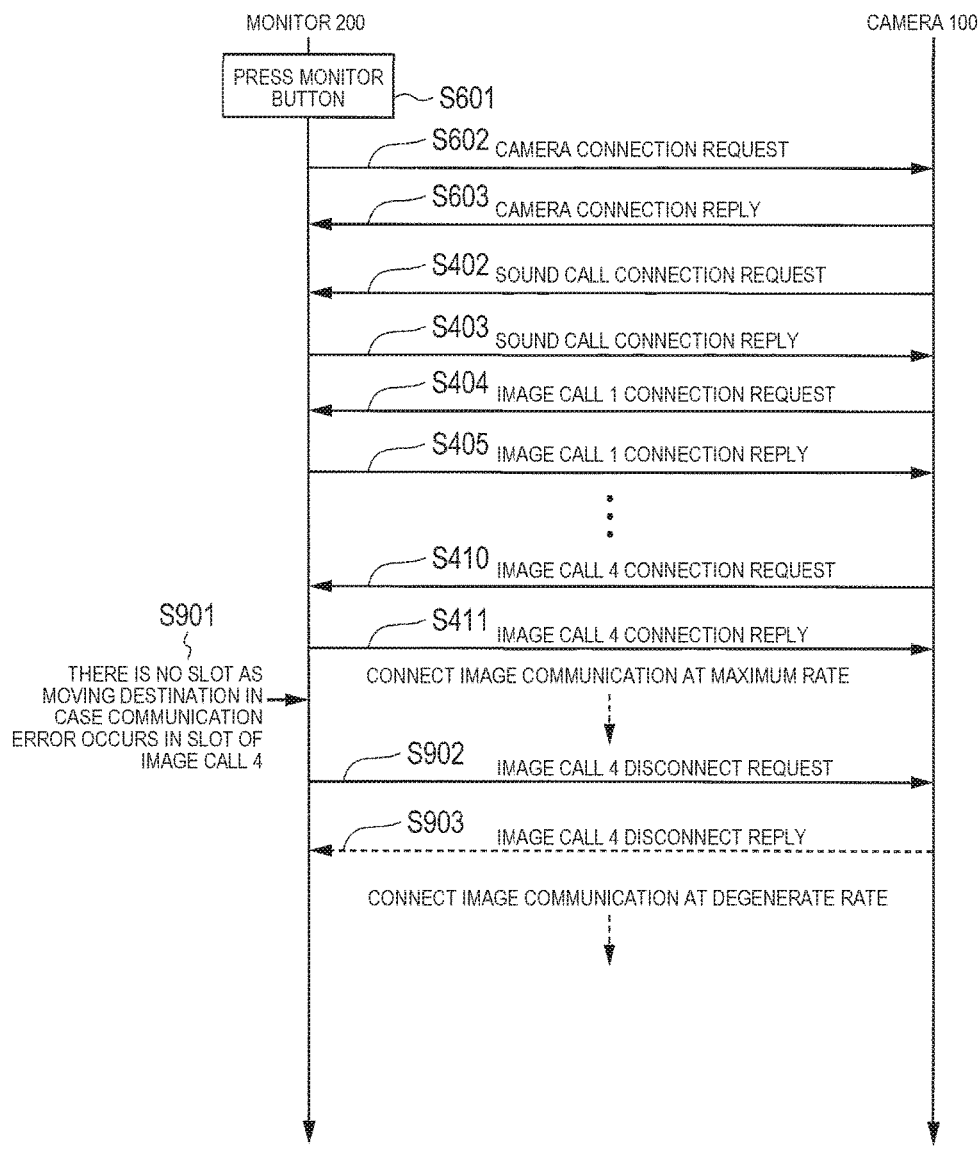
FIG. 13 is a sequence diagram showing another procedure in which the monitor button of the monitor is pressed and the camera and the monitor are connected in Exemplary Embodiment 2.

FIG. 13 is a sequence diagram showing another procedure in which the monitor button of monitor 200 is pressed and camera 100 and monitor 200 are connected. However, the portions in FIG. 13 common to those in FIGS. 6 and 11 will be assigned the same reference numerals as those in FIGS. 6 and 11, and the redundant description thereof will be omitted.

Step S601 to S603 and S402 to S411 in FIG. 13 are common to those in FIG. 6, and connection requests and connection replies for sound calls and image calls 1 to 4 are transmitted and received between camera 100 and monitor 200. In FIG. 13, a case where the number of image calls are 4 and all the image calls are connected is shown.

Step S901 to S903 in FIG. 13 are common to those in FIG. 11, and in this case, camera 100 and monitor 200 transmit and receive the image data at a degenerate transmission rate.

In FIGS. 10 to 13, even though the image connection is performed earlier and the sound connection is performed later, the same effect can be obtained. In FIGS. 10 and 12, in a case where the communication error occurs, monitor 200 may transmit error information indicating the occurrence of the communication error instead of transmitting the slot movement request (S802), and camera 100 may transmit the slot movement request. In FIGS. 10 and 12, camera 100 may not transmit the slot movement reply (S803). In FIGS. 11 and 13, camera 100 may not transmit the disconnect reply (S902).

<Control Flow of Monitor>

Figure 14:
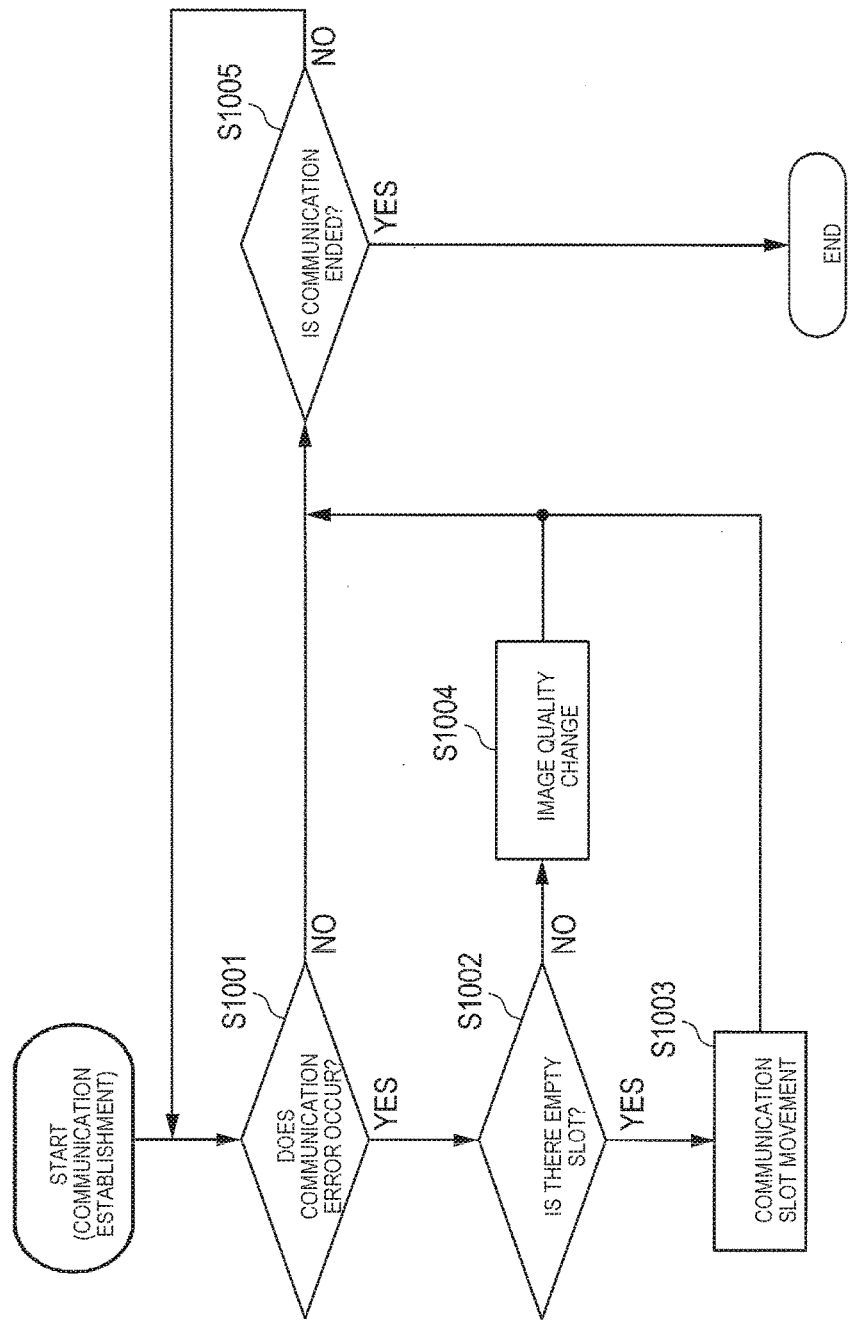
FIG. 14 is a control flowchart of the monitor according to Exemplary Embodiment 2.

Hereinafter, the control flow of monitor 200 according to the present exemplary embodiment will be described with reference to FIG. 14.

Controller 202 checks whether or not the communication error occurs in the image data received from camera 100 in a state in which the communication with camera 100 is established. In a case where the communication error does not occur (S1001: NO), the current state is maintained until the communication with camera 100 is ended (S1005: NO, the flow returns to S1001).

In a case where the communication error occurs (S1001: YES), controller 202 checks whether or not there is a slot as a moving destination in an empty state. In a case where there is the slot in the empty state (S1002: YES), controller 202 transmits the slot movement request to camera 100 (S1003). Meanwhile, in a case where there is no state in the empty state (S1002: NO), controller 202 changes image quality by controlling the number of connected image calls (S1004). After S1003 or S1004, the current state is maintained until the communication with camera 100 is ended (S1005: NO, the flow returns to S1001).

As stated above, according to the present exemplary embodiment, since the number of connected image calls can be controlled depending on whether or not the communication error occurs, it is possible to vary the image quality (a frame rate, a compression ratio, and an image size) depending on the radio wave status.

As an example in which the image quality is deteriorated, a frame rate may be lowered, an image compression ratio may be raised, or an image size may be reduced. If the frame rate is lowered, the image quality is maintained but the motion of the image becomes dull. If the image compression ratio is raised or the image size is reduced, the motion of the image is maintained but the image quality is deteriorated.

Although it has been described in the present exemplary embodiment that camera 100 searches for the reference control signal transmitted from monitor 200 to establish communication synchronization, establishes the sound call, and notifies monitor 200 that the visitor visits, the present disclosure is not limited thereto. For example, the doorbell button may be pressed, and camera 100 may notify monitor 200 that the visitor visits as a reply to the reference control signal transmitted from monitor 200, and may sequentially establish the sound call and the image call.

In the present exemplary embodiment, as the frequency band used by intercom system 10, a frequency band that is less likely to be used in another system may be selected from a plurality of frequency bands.

In the present exemplary embodiment, as the frequency band used by intercom system 10, a frequency band of 1880 MHz to 1978 MHz or 2010 MHz to 2025 MHz may be selected.

It has been described in the present exemplary embodiment that there are the case where as the power supply of monitor 200, the power is input from the AC power supply or the AC adapter and the case where the power supply is the battery. In a case where the power supply of monitor 200 is the battery, only when the connection of monitor 200 with the external power supply on the charging stand is blocked, monitor 200 may perform an intermittent operation. Accordingly, the power consumption of monitor 200 can be reduced.

In a case where the connection of monitor 200 with the external power supply on the charging stand is blocked, the intercom system may set camera 100 such that the camera is periodically in the sleep state. Accordingly, when the communication synchronization of camera 100 and monitor 200 is got out, these devices are easy to return to their original states, and thus, the system can be stabilized.

In a case where the battery of monitor 200 is the battery, monitor 200 notifies camera 100 that the monitor is operated in the ultra-low power consumption mode conformable to the DECT method, and transits into the ultra-low power consumption mode.

The present disclosure is beneficial to the reduction of the power consumption by stably performing the wireless communication between the camera and the monitor.

What is claimed is:

1. An intercom system in compliance with DECT (Digital Enhanced Cordless Telecommunications) standard using a time-division multiplexing communication method, the system comprising:
   a camera, which, in operation, obtains image data and sound data, and
   a monitor, which is communicable with the camera via DECT and which, in operation, assigns image data slots and sound data slots to the camera,
   wherein the monitor,
      in response to receiving the image data from the camera in first image quality without error, displays the received image data in the first image quality, and
      in response to encountering an error in receiving the image data from the camera in the first image quality, decreases a number of the image data slots assigned to the camera, receives the image data from the camera in second image quality lower than the first image quality using the decreased number of the image data slots, and displays the received image data in the second image quality.

2. The intercom system of claim 1,
wherein the camera is driven by a battery, is released from a sleep state at regular intervals, and receives a control signal from the monitor.

3. The intercom system of claim 1,
wherein the image data in the second image quality has at least one of a lower frame rate, a higher image compression ratio, and a smaller image size compared to the image data in the first image quality.

4. An intercom system in compliance with DECT (Digital Enhanced Cordless Telecommunications) standard using a predetermined frequency band and a time-division multiplexing communication method, the system comprising:
   a camera, which, in operation, obtains image data an sound data, and
   a monitor, which is communicable with the camera via DECT and which, in operation, assigns one sound data slot and at least two image data slots to the camera,
   wherein the monitor,
      receives the image data from the camera in first image quality and displays the received image data in the first image quality, and
      depending on a radio wave status between the monitor and the camera, increases or decreases the number of image data slots assigned to the camera, receives the image data from the camera in second image quality higher or lower than the first image quality using the increased or decreased number of the image data slots, and displays the received image data in the second image quality.

5. The intercom system of claim 4,
wherein, if the radio wave status between the monitor and the camera is not deteriorated, a predetermined number of image data slots is assigned in response to a request transmitted from the camera.

6. The intercom system of claim 4,
wherein, in a case where the number of image data slots used to transmit the image data is less than a predetermined number of available slots, the camera transmits a request after a predetermined time elapses to request the monitor to assign more image data slots up to the predetermined number.

7. The intercom system of claim 4,
wherein a frequency band of 1880 MHz to 1930 MHz is used as the predetermined frequency band.

8. The intercom system of claim 4,
wherein the camera is driven by a battery, is released from a sleep state at regular intervals, and receives a control signal from the monitor.

9. The intercom system of claim 4,
wherein the image data in the second image quality which is higher than the first image quality has at least one of a higher frame rate, a lower image compression ratio, and a larger image size compared to the image data in the first image quality, and
wherein the image data in the second image quality which is lower than the first image quality has at least one of a lower frame rate, a higher image compression ratio, and a smaller image size compared to the image data in the first image quality.

* * * * *